(12) United States Patent
Euchner et al.

(10) Patent No.: US 7,620,201 B2
(45) Date of Patent: Nov. 17, 2009

(54) SYSTEM AND METHOD FOR MAILING SERVICES INCLUDING NOTIFICATION TO RECIPIENT OF ITEMS REQUIRING TIME SENSITIVE ACTIONS

(75) Inventors: James A. Euchner, Waccabuc, NY (US); Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1077 days.

(21) Appl. No.: 11/018,666

(22) Filed: Dec. 21, 2004

(65) Prior Publication Data

US 2006/0168034 A1    Jul. 27, 2006

(51) Int. Cl.
*G06K 9/00*    (2006.01)
*G06Q 40/00*    (2006.01)

(52) U.S. Cl. .................. 382/101; 382/321; 705/40

(58) Field of Classification Search ........... 382/101, 382/102, 103, 112, 113, 114, 115, 135, 136, 382/137, 138, 139, 157, 168, 181, 189, 190, 382/193, 209, 224, 232, 254, 274, 276, 305, 382/312, 318, 321; 705/34, 40, 402, 408; 235/375

See application file for complete search history.

(56) References Cited

U.S. PATENT DOCUMENTS

| | | | |
|---|---|---|---|
| 5,464,099 A | 11/1995 | Stevens et al. | |
| 6,112,193 A * | 8/2000 | Dlugos et al. | 705/408 |
| 6,459,953 B1 | 10/2002 | Connelly et al. | |
| 6,578,015 B1 * | 6/2003 | Haseltine et al. | 705/34 |
| 6,592,027 B2 * | 7/2003 | Kovlakas | 235/375 |
| 6,775,590 B2 | 8/2004 | Pintsov et al. | |
| 7,233,929 B1 * | 6/2007 | Lingle et al. | 705/402 |
| 7,395,243 B1 * | 7/2008 | Zielke et al. | 705/40 |
| 7,478,066 B2 * | 1/2009 | Remington et al. | 705/40 |
| 2003/0111392 A1 | 6/2003 | Daniels, Jr. et al. | |
| 2003/0168388 A1 | 9/2003 | Malatesta | |
| 2004/0178128 A1 | 9/2004 | O'Connell et al. | |

* cited by examiner

*Primary Examiner*—Seyed Azarian
(74) *Attorney, Agent, or Firm*—Brian A. Lemm; Angelo N. Chaclas

(57) ABSTRACT

A notification system and method that enables mail recipients to easily identify mail items that require some action on their part, as well as easily ascertain the date by which the action must be taken, is provided. Mail items that require some action on the part of the recipient are identified, utilizing information contained on the mail piece, and the anticipated due date for such an action is computed. A notification of action required and the computed date due can then be printed on the mail piece in a conspicuous manner. Optionally, one or more notification messages and/or reminder messages can be sent via a communication network to a communication device associated with the recipient to notify and/or remind the recipient about the action due. Thus, the chance of the recipient not taking action by the required date is significantly decreased.

12 Claims, 2 Drawing Sheets

SYSTEM AND METHOD FOR MAILING SERVICES INCLUDING NOTIFICATION TO RECIPIENT OF ITEMS REQUIRING TIME SENSITIVE ACTIONS

FIELD OF THE INVENTION

The invention disclosed herein relates generally to mail processing systems, and more particularly to a mail processing system that provides notification to mail piece recipients of items that require time sensitive actions.

BACKGROUND OF THE INVENTION

The United States accounts for the largest domestic letter traffic in the world, handling almost 200 billion pieces of mail each year. Many companies and private concerns use the mailing system to provide advertising information to customers or potential customers, and solicit information and responses from customers or potential customers. A few examples of the way the mail system is utilized includes, for example, advertising catalogues, sales brochures, and the like, subscription or potential business solicitations, information request responses, proxy statement responses, remittance documents (invoices for payment due) and the like.

Due to the volume of mail that gets delivered each day, it is not uncommon for a recipient to receive several pieces of mail each day. The recipient, therefore, is forced to sift through the numerous pieces of mail received each day to separate those mail items that might require some time sensitive action on the part of the recipient from those that do not. Such items that might require a time sensitive action on the part of the recipient can include, for example, invoices or notices of payment due, reminder notices, and the like. Many, if not all, of the items that require some action on the part of the recipient require the recipient to take such action within a predetermined amount of time. For example, credit card companies and utility companies send invoices to their customers by mail and the customers (recipients) are required to provide payment within some predetermined amount of time. Frequently, if the recipient fails to take the necessary action, such as, for example, providing payment by the due date, there can be substantial penalties and financial charges levied by the sender. It is, therefore, extremely beneficial to the recipient to be able to easily distinguish those mail items that require some action on the part of the recipient from those that do not, as well as to easily determine a date by which the action must be taken. With the large amount of mail received each day, however, it is sometimes difficult to distinguish between the different mail items without having to open and read each item, and it is impossible to determine the date by which the action must be taken without opening and reading those mail pieces that do require some action. Furthermore, if the recipient does not sort the received mail each day, a large amount of mail can accumulate with the recipient, and those items that require some action can easily be misplaced or forgotten about, thereby causing the recipient to miss the action due date and suffer the penalties associated therewith.

Thus, there exists a need for a system and method that enables mail recipients to easily identify mail items that require some action on their part, as well as easily ascertain the date by which the action must be taken.

SUMMARY OF THE INVENTION

The present invention alleviates the problems associated with the prior art and provides a notification system and method to enable mail recipients to easily identify mail items that require some action on their part, as well as easily ascertain the date by which the action must be taken.

According to embodiments of the present invention, as mail pieces are processed by mail processing equipment operated by, for example, a postal operator or a mail consolidator, those mail items that require some action on the part of the recipient are identified, utilizing information contained on the mail piece, and the anticipated due date for such an action is computed based on knowledge of billing cycles or previous experience with specific senders. A notification of action required and the computed date due can then be printed on the mail piece in a conspicuous manner, such as, for example, in large font with a brightly colored ink. This marking will enable the mail recipient to easily identify mail items that require some action on their part, as well as easily ascertain the date by which the action must be taken.

According to other embodiments of the present invention, the recipient can provide a communication method, such as, for example, telephone number, fax number or e-mail address. When a mail item intended for that recipient is being processed and determined to require some action on the part of the recipient, one or more notification messages and/or reminder messages can be sent to the recipient to notify and/or remind the recipient about the action due. Thus, the chance of the recipient not taking action by the required date is significantly decreased.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
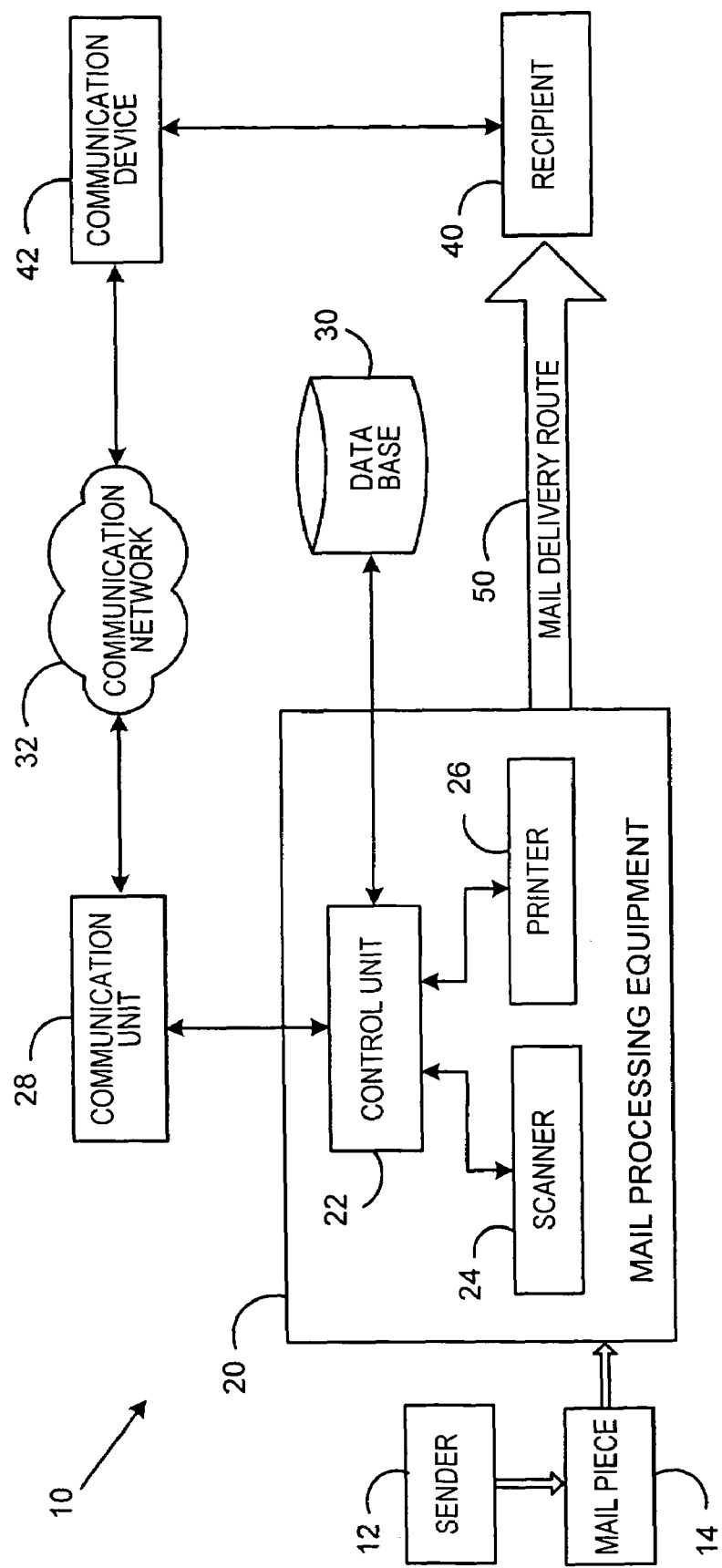
FIG. 1 illustrates in block diagram form an example of a mail processing system according to embodiments of the invention.

In describing the present invention, reference is made to the drawings, wherein there is seen in FIG. 1 an example of portions of a mail processing system 10 according to embodiments of the invention. A sender 12, or an agent of the sender 12, generates a mail piece 14 intended for a recipient 40. Sender 12 could be, for example, a credit card company, utility company, merchandiser, or any other type of goods or service provider. The mail piece 14 generated by the sender 12 requires some action on the part of the recipient 40, such as, for example, remitting payment to the sender 12. Accordingly, the mail piece 14 provides the recipient 40 with information related to the action required of the recipient 40, including, for example, the amount of payment due, the due date by which payment must be made, an itemized accounting of any charges, account numbers, etc.

System 10 further includes mail processing equipment 20 that is utilized to process mail pieces by, for example, a postal operator or a mail consolidator. The mail processing equipment 20 includes a control unit 22 that controls operation of the mail processing equipment 20, a scanner 24 for scanning mail pieces being processed by the mail processing equipment 20, and a printer 26 for printing on the mail pieces being processing by the mail processing equipment 20. Control unit 22 can include, for example, a general or special purpose processor, microcontroller, or the like. It should be noted that mail processing equipment 20 is not limited to the above devices and can include additional devices typically utilized to process mail pieces. The control unit 22 is coupled to a data base 30 that stores information related to recipient 40 as described further below. Control unit 22 is also optionally coupled to a communication unit 28, such as, for example, a modem or the like, that enables the control unit 22 to communicate via a communications network 32 with a communication device 42 associated with the recipient 40 as described below. The mail piece 14 is delivered to the recipient 40 via a mail delivery route 50.

Figure 2:
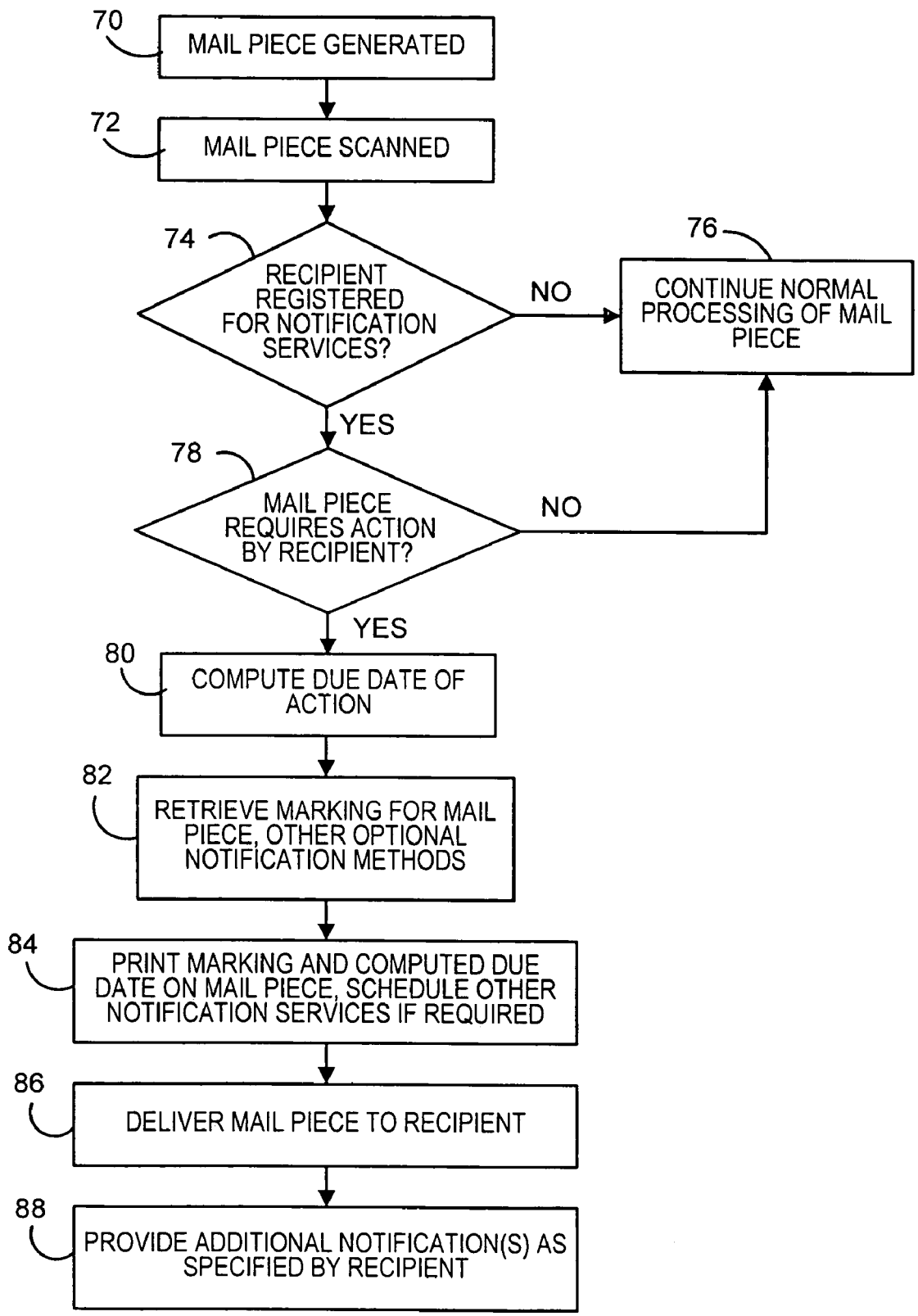
FIG. 2 illustrates in flow chart form the processing performed for mail items according to embodiments of the invention.

The operation of the mail processing system 10 according to embodiments of the present invention will now be described with respect to FIG. 2. In step 70, a mail piece 14 is generated by the sender 12, or an agent of the sender 12, for sending to the recipient 40, and provided to either a postal operator, mail consolidator, or other organization that utilizes mail processing equipment 20 to process mail pieces. In step 72, the mail piece 14 is scanned using the scanner 24. Data from the mail piece 14 is obtained by the scanner 24, including, for example, the name and address of the recipient 40 from the destination address of the mail piece 14, the name and address of the sender 12 from the return address on the mail piece 14, the postage amount applied to the mail piece 14, the class of service by which the mail piece 14 is to be delivered, e.g., first class, second class, etc., and any other markings or information that may be printed on the mail piece 14. The data obtained by the scanner 24 is provided to the control unit 22.

In step 74, the control unit 22 determines if the recipient 40 of the mail piece 14 is registered for the notification services of the present invention that mail processing equipment 20 provides. Data base 30 can be utilized to maintain a list of all recipients that have registered to receive the notification services that mail processing equipment 20 provides. The control unit 22 will compare the information from the destination address of the mail piece 14 to the information for registered recipients maintained in the data based 30 to determine if the recipient 40 is a registered user. If the recipient 40 is not registered for the notification services, then in step 76 processing of the mail piece 14 will continue in a normal manner.

If in step 74 it is determined that the recipient 40 has registered for the notification services of the present invention, then in step 78 it is determined if the mail piece 14 requires some action on the part of the recipient 40. This determination is made by the control unit 22 based on information obtained from the mail piece 14 by the scanner 24. For example, the identification of the sender 12 can be utilized in determining if the mail piece 14 requires some action on the part of the recipient 40. Mail pieces from credit card companies, utility companies, and the like can include items that require some action on the part of the recipient, such as a bill. The postage amount applied to the mail piece 14 or class of service by which the mail piece 14 is to be delivered can also be used, in conjunction with the identification of the sender 12, to determine if the mail piece 14 requires some action on the part of the recipient 40. Currently, U.S. law requires companies that send bills and statements by mail to send them via first class mail, thereby ensuring timely delivery to the recipient. Thus, the postage value, which is indicative of a certain class of mail, or the class of mail itself if printed on the mail piece 14, can provide information as to the contents of the mail piece 14. Mail pieces from credit card companies or utility companies that do not contain an invoice or statement, and instead relate to informational material or promotions, are typically not sent by first class mail, but instead by a lower class, thereby reducing the expense of mailing for the credit card or utility companies. Mail pieces that contain an invoice or statement, however, must be sent by first class mail. Thus, if the control unit 22 determines that the mail piece 14 is from a credit card company or utility company, and is being delivered by first class mail, there is a strong likelihood that the mail piece 14 contains an invoice, statement or the like that requires some action to be taken by the recipient 40 in response to the mail piece 14. In addition, some companies mark mail pieces they generate that include an invoice or statement with a banner, such as, for example, "Invoice Enclosed" or "Your Statement Is Enclosed." These types of markings can also be used by control unit 22 to determine that the mail piece 14 requires action by the recipient 40. Using the information as described above, the control unit 22 can therefore make a determination if the recipient 40 is required to take some action in response to the mail piece 14. If in step 78 it is determined that the mail piece 14 does not require action on the part of the recipient, then in step 76 processing of the mail piece 14 will continue in a normal manner.

If in step 78 it is determined that the mail piece 14 does require some action to be taken by the recipient 40, then in step 80 the control unit 22 will compute a due date by which the action will most likely be required. This computation is based on several pieces of information available to the control unit 22. Typically, credit card companies and utility companies have a standard grace period between the date of mailing of an invoice or statement and the date the recipient must respond. The standard grace periods for different credit card companies or utility companies can be easily ascertained from the company itself or by simple observation. Although the billing cycles for every company may be different, i.e., not every customer will receive a bill on the same day, the grace period is standard. The date of mailing is known by the control unit 22, since the date of mailing will typically correspond with the date the mail piece 14 is received from the sender 12. Based on the identification of the sender 12, the standard grace period for the sender 12 can be obtained, for example, from a look-up table in the data base 30, and the due date computed by the control unit 22 by adding the number of days of the grace period for the sender 12 to the current date.

In step 82, the control unit 22 will retrieve a marking to be placed on the mail piece 14 to provide a notification of the action due. Preferably, when the recipient 40 registers for the notification services of the present invention, the recipient 40 will provide a preferred marking to be printed on each mail piece that requires some action to be taken, and the preferences of the recipient 40 stored in the data base 30. For example, the recipient 40 may desire the marking to read "Attention—Requires Action by (DATE)" where (DATE) is the date computed by the control unit 22 in step 80. Alternatively, the marking could read "Attention—Requires Action Within X Days" where X is the grace period for the sender 12. Of course, the marking requested by the recipient 40 can be customized as desired by the recipient 40 to say anything desired, or could simply be a default marking. The control unit 22 can retrieve the desired marking from the data base 30 for the recipient 40.

Optionally, when the recipient 40 registers for the notification services of the present invention, the recipient 40 can also provide information to allow the control unit 22 to communicate with a communication device 42 associated with the recipient 40. The communication device could be, for example, a telephone, a facsimile machine, or an electronic device for receiving e-mail. The recipient 40 preferably indicates the content of the notification message, and the timing and number of notification messages that are desired to be received by the recipient. If the recipient has provided this type of information, then also in step 82 the control unit 22 will retrieve the information for the notification device 42.

In step 84, the marking retrieved from the data base 30, including the due date of the action, is printed on the mail piece 14 by the printer 26. The marking is preferably printed on the mail piece 14 by the printer 26 in such a format that it is conspicuous and easily recognizable by the recipient 40. For example, the marking could be printed in a large font, using a brightly colored ink, using a specialized font, or any combination of these. The recipient 40 will then be able to easily identify the mail piece 14 as one requiring some action be performed, and can also easily ascertain the date by which the action must be taken, as it will be provided directly on the mail piece 14. The recipient 40, therefore, does not need to open the mail piece 14 to determine this information.

If the recipient 40 has also requested additional notification services using the communication device 42, then also in step 84 the control unit 22 will determine the type and number of notification(s) to be provided and schedule the notification(s). For example, the recipient can request that one or more notification messages be provided to the communication device 42 at some predetermined time, such as, for example, when the mail piece 14 is being processed by the mail processing equipment 20, a predetermined number of days after the mail piece 14 has left the mail processing equipment 20, a predetermined number of days before the computed action due date, on the action due date, or any combination of the above. If the recipient 40 has requested notification based on the processing of the mail piece 14, then also in step 84 the control unit will utilize the communication unit 28 to communicate with the communication device 42 via the communication network 32 to provide the requested notification to the recipient 40. For example, the notification could be an automated telephone call or e-mail that notifies the recipient 40 that a mail piece 14 has been sent by the sender 12, and that some action is required to be taken by the recipient 40 by the computed action due date.

In step 86, the mail piece 14 is delivered to the recipient via the mail delivery route 50. As noted above, because of the marking printed on the mail piece 14 by the printer 26, the recipient 40 can easily identify the mail piece 14 as one requiring some action be performed, and can also easily ascertain the date by which the action must be taken, without having to open the mail piece 14 to determine this information. In step 88, the control unit 22 provides any additional notification services requested by the recipient 40 to the communication device 42. Thus, one or more reminder messages can be sent to the recipient 40 via the communication device 42 as previously requested by the recipient 40. The reminder messages could be an automated telephone call or e-mail that reminds the recipient 40 of the mail piece 14 sent by the sender 12, and that some action is required to be taken by the recipient 40 by the computed action due date. The reminder messages can be sent based on the delivery schedule requested by the recipient 40, or on a default schedule established by the control unit 22.

Thus, according to embodiments of the present invention, mail items that require some action on the part of the recipient are identified, utilizing information contained on the mail piece, and the anticipated due date for such an action is computed. A notification of action required and the computed date due can then be printed on the mail piece in a conspicuous manner. This marking will enable the mail recipient to easily identify mail items that require some action on their part, as well as easily ascertain the date by which the action must be taken. Optionally, one or more notification messages and/or reminder messages can be sent via a communication network to a communication device associated with the recipient to notify and/or remind the recipient about the action due. Thus, the chance of the recipient not taking action by the required date is significantly decreased.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A method for processing a mail piece using mail processing equipment, the mail piece being sent from a sender to a recipient, the method comprising:

scanning the mail piece, using a scanner of the mail processing equipment, to obtain information from the mail piece, the information including the sender and at least one of a postage amount and class of service for the mail piece;

determining, by a control unit of the mail processing equipment, based on at least a portion of the information obtained from the mail piece, if the mail piece requires an action to be performed by the recipient of the mail piece in response to the mail piece;

if an action is required to be performed by the recipient, calculating, by the control unit, based on the sender of the mail piece, a due date for the action; and printing a marking on the mail piece using a printer of the mail processing equipment, the marking indicating an action is required by the recipient, the marking including the calculated due date for the action;

wherein determining if the mail piece requires an action further comprises determining, based on the sender and one of the postage amount or class of service, if the mail piece requires an action to be performed by the recipient in response to the mail piece.

2. The method of claim 1, wherein the information obtained from the mail piece further includes the recipient.

3. The method of claim 1, wherein before it is determined if the mail piece requires an action, the method further comprises:

determining if the recipient has requested the marking to be printed on the mail piece.

4. The method of claim 1, wherein calculating a due date further requires:

determining a standard grace period given by the sender; and calculating the due date based on the standard grace period given by the sender.

5. The method of claim 4, wherein the due date is calculated as one of a specific date or a number of days.

6. The method of claim 1, further comprising:

automatically sending a message to a communication device associated with the recipient indicating an action is required by the recipient in response to the mail piece from the sender and the due date for the action.

7. The method of claim 6, further comprising:

automatically sending the message a plurality of times.

8. The method of claim 6, wherein the communication device is one of a telephone, facsimile or electronic device for receiving e-mail.

9. A mail processing system comprising:

a scanner for scanning a mail piece to obtain information from the mail piece, the information including the sender and at least one of a postage amount and class of service for the mail piece;

a control unit, coupled to the scanner, the control unit receiving the information obtained from the mail piece and determining, based on at least a portion of the information obtained from the mail piece, if the mail piece requires an action to be performed by a recipient of the mail piece in response to the mail piece and calculating, based on the sender of the mail piece, a due date for the action; and a printer, coupled to the control unit, to print a marking on the mail piece indicating an action is required by the recipient, the marking including the calculated due date for the action;

wherein the control unit determines if the mail piece requires an action to be performed by a recipient of the mail piece in response to the mail piece based on the sender of the mail piece and one of a postage amount or class of service for the mail piece.

10. The system of claim 9, further comprising:

a data base for storing the marking, wherein the control unit retrieves the marking for the recipient from the data base for printing on the mail piece.

11. The system of claim 9, further comprising:

a communication unit coupled to the control unit, wherein the control unit automatically sends a notification message to a communication device associated with the recipient, via the communication unit, indicating an action is required by the recipient in response to the mail piece from the sender and the due date for the action.

12. The system of claim 9, wherein the control unit calculates the due date based on a standard grace period given by the sender.

* * * * *